United States Patent [19]

Dai et al.

[11] Patent Number: 5,126,299
[45] Date of Patent: Jun. 30, 1992

[54] CATALYST FOR THE CONTROL OF $SO_x$ EMISSION

[75] Inventors: Pei-Shing E. Dai, Port Arthur; Edward H. Holst, Nederland, both of Tex.

[73] Assignee: Texaco Inc., White Plains, N.Y.

[21] Appl. No.: 644,351

[22] Filed: Jan. 22, 1990

Related U.S. Application Data

[62] Division of Ser. No. 425,157, Oct. 23, 1989, Pat. No. 5,021,228.

[51] Int. Cl.⁵ .................. B01J 23/04; B01J 23/12
[52] U.S. Cl. ........................ 502/78; 502/64; 502/216; 502/243; 502/300; 502/344
[58] Field of Search ............ 502/300, 344, 64, 78, 502/216, 243; 423/252

[56] References Cited

U.S. PATENT DOCUMENTS

| | | | |
|---|---|---|---|
| 3,717,699 | 2/1973 | Nicklin et al. | 502/300 X |
| 3,933,751 | 1/1976 | Callahan et al. | 502/243 X |
| 4,532,230 | 7/1985 | Colmenares et al. | 502/344 |
| 4,608,447 | 8/1986 | Mazanec et al. | 502/344 X |

FOREIGN PATENT DOCUMENTS 283635 9/1988 European Pat. Off. ............ 502/243

Primary Examiner—W. J. Shine
Attorney, Agent, or Firm—Robert A. Kulason; James J. O'Loughlin; Carl G. Seutter

[57] ABSTRACT

Sulfur oxides are removed from gases by contact with a composition containing 3 wt % potassium and 1 wt % thorium on alumina.

10 Claims, No Drawings

CATALYST FOR THE CONTROL OF $SO_x$ EMISSION

This is a division of application Ser. No. 07/425,157, filed Oct. 23, 1989, now U.S. Pat. No. 5,021,228.

FIELD OF THE INVENTION

This invention relates to a process for removing a gaseous sulfur compound from a mixture of gases containing sulfur oxides. More particularly, it relates to fluid catalytic cracking under conditions whereby the sulfur oxide content of the regenerator off-gas is lowered.

BACKGROUND OF THE INVENTION

As is well known to those skilled in the art, when sulfur-containing charge hydrocarbons are admitted to a fluid catalytic cracking (FCC) reactor, the charge is converted to lower boiling products including those falling within the motor fuel boiling range. A portion of the sulfur in the charge hydrocarbon is liberated in the reactor as hydrogen sulfide and mercaptans which may be separated from the FCCU cracked products. A portion of the sulfur is fixed on the coke-containing spent catalyst which is passed from the reaction zone to the regeneration zone wherein an oxygen-containing gas is provided to regenerate the spent catalyst. The gas formed during regeneration includes oxides of carbon as the coke is burned from the surface of the catalyst. The gas so formed also includes oxides of sulfur (principally sulfur dioxide plus some sulfur trioxide); and these oxides of sulfur may be the predominant undesirable species in the regenerator off-gas.

Economic considerations prevent the effective removal of sulfur oxides from the regenerator off gas; and environmental considerations dictate that they be decreased. Prior art attempts include operation under conditions such that the sulfur in the regeneration zone is fixed on the catalyst (thereby lowering the $SO_x$ content of the regenerator off-gas); and the sulfur is released as additional mercaptan and hydrogen sulfide in the reaction zone. Here these sulfur compositions may be readily passed to effluent separation operations, which would not be the case for sulfur-containing gases recovered as regenerator waste-gas.

Illustrative of prior art endeavors in this area include those disclosed in U.S. Pat. No. 4,344,926 issued Aug. 17, 1982 to Texaco Inc. as assignee of Randall H. Petty and Burton H. Bartley (the text of which is incorporated herein by reference) and the prior art cited therein.

It is an object of this invention to provide a process for removing a gaseous sulfur compound from a mixture of gases containing sulfur oxides. Other objects will be apparent to those skilled in the art.

STATEMENT OF THE INVENTION

In accordance with certain of its aspects, this invention is directed to a process for removing a gaseous sulfur component from a mixture of gases containing sulfur oxides which comprises contacting said mixture of gases containing sulfur oxides at 800° F.–1500° F. (427° C.–816° C.) with a composite containing a porous refractory support bearing as a first component (i) at least one metal of the actinium series, such as thorium and as a second component (ii) at least one alkali metal.

DESCRIPTION OF THE INVENTION

The mixtures of gases which may be treated by the process of this invention include gases which contain sulfur oxides; and commonly such gases are found to contain, as the principal oxide of sulfur, sulfur dioxide — with lesser quantities of sulfur trioxide.

In the preferred embodiment, this invention finds use in connection with fluid catalytic cracking (FCC) wherein a charge hydrocarbon is subjected to cracking conditions including temperature of 800° F.–1200° F. (427° C.–649° C.), typically 960° F. (516° C.) to yield cracked product containing hydrocarbons boiling in the motor fuel boiling range. When the charge to cracking (typically a gas oil) contains sulfur, a portion of this sulfur is reduced in the reaction zone to hydrogen sulfide and mercaptans which are recovered with the cracked product from which they may readily be separated.

During reaction, the fluid catalyst particles become deactivated as they are covered with coke; and they also pick up a substantial portion of sulfur. This spent catalyst is passed to a regeneration zone wherein spent catalyst is contacted with oxygen-containing gas, typically air, at 1100° F.–1500° F. (595° C.–815° C.), typically 1350° F. (732° C.); and under these conditions, the spent catalyst is regenerated and may thereafter be returned to the reaction zone. During regeneration, the coke content of the spent catalyst is oxidized to form regenerator off-gas including carbon dioxide and carbon monoxide. Sulfur in the spent catalyst is oxidized to form regenerator off-gas including carbon dioxide and carbon monoxide. Sulfur in the spent catalyst is oxidized to form sulfur dioxide and sulfur trioxide. The content of $SO_x$ (oxides of sulfur) in the regenerator off-gas, when the initial sulfur-containing charge contains 0.5 w %–2.5 w %, say 2 w % sulfur, may be as high as 4 w %–5 w % of the sulfur content of the charge hydrocarbon to the reaction zone. The $SO_x$ content of regenerator off-gas under these conditions may be 2000–3000 ppm(v), say 2500 ppm(v). It is a feature of the process of this invention that the $SO_x$ content of these sulfur-containing gases may be reduced by contacting these gases at 800° F.–1500° F. (427° C.–815° C.), preferably 1100° F.–1500° F. (595° C.–815° C.) say 1350° F.) (732° C.) with a composite containing a porous refractory support bearing as a first component (i) at least one metal of the actinium series such as thorium and as a second component (ii) at least one alkali metal, preferably potassium or sodium or cesium.

The porous refractory support which may be employed in practice of the process of this invention may be active or inactive or inert. Typical of such supports may be alumina (e.g. gamma alumina), silica, magnesia, silica-alumina, silica-magnesia, mordenite, zeolites, etc. When the $SO_x$-containing gases are passed from the regeneration zone to a separate conversion zone, the support may be any convenient support whether active or inactive or inert and may be of particle size comparable to that utilized in fluid bed operations (e.g. 20–200 microns) or that utilized in fixed bed operations (e.g. 0.1–1 inch).

It is, however, preferred in the case of FCC operations, that the support be of particle size suitable or use in FCC operations (20–200 microns). Although it is possible to utilize, as the support for removing gaseous sulfur compounds, the fluidized catalyst which is used in FCC operations, it is preferred that this support be a different phase; i.e. even in those instances when it is the same composition as the support for the FCC catalyst (or as the FCC catalyst), it is preferred that it be formulated separately and thereafter mixed with the FCC catalyst Typical FCC catalyst may include that marketed by Davison Chemical Division of W. R. Grace and Company under the trademark CBZ-1 containing a synthetic crystalline Y-type zeolite in an amorphous silica-alumina matrix having the following characteristics:

TABLE

| Cracking Catalyst | |
|---|---|
| Property | Value |
| Surface Area, m$^2$/gm | 105 |
| Pore Volume cc/gm | 0.37 |
| Density, lb/ft$^3$ | 47.6 |
| Aerated | |
| Settled | 51.8 |
| Particle Size Distribution, wt. % | |
| 0-20 microns | 0 |
| 20-40 microns | 0 |
| 40-80 microns | 22 |
| 80+ microns | 78 |
| Average Particle Size, (microns) | 86 |
| Alumina Content, wt. % | 37.7 |
| Sodium Content, wt. % | 0.41 |
| X-Ray Metals, wppm* | |
| Cu | 10 |
| Ni | 220 |
| Fe | 3330 |
| Cr | 310 |
| V | 370 |
| Zeolite Content, wt. % | 7.9 |

*parts per million by weight

Illustrative porous refractory supports which may be employed in the SO$_x$ removing compositions of this invention may include a gamma-alumina prepared by calcining for 3 hours at 900° F. (482° C.): the Catapal SB brand of high purity alpha alumina monohydrate marketed by Conoco Chemicals Division of Continental Oil Company. This gamma-alumina product is characterized as follows:

TABLE II

| Alumina content*, wt. % | 75% |
|---|---|
| Loss on Ignition, wt. % | 25% |
| Carbon*, wt. % | 0.3% |
| SiO$_2$*, wt. % | 0.008% |
| Fe$_2$O$_3$*, wt. % | 0.005% |
| Na$_2$O*, wt. % | 0.004% |
| Sulfur*, wt. % | 0.01% |
| TiO$_2$*, wt. % | 0.12% |
| Crystal Structure* | alpha-alumina monohydrate |
| Crystal Structure** | gamma-alumina |
| Surface Area (BET)** | 250 m$^2$/g |
| Pore Volume** | |
| 0-100A | 0.45 cc/gm |
| 0-10,000A | 0.50 cc/gm |
| Loose Bulk Density* | 49 lb/ft$^3$ |
| Particle Size Distribution* | 48 < 45 microns |
| | 9% > 90 microns |

*as received
**After calcination for 3 hrs. at 900° F. (482° C.).

In the preferred embodiment the additive composition of the instant invention is prepared (as on alumina support) separately from the FCC cracking catalyst; and it is then mixed with the FCC catalyst to yield a mixture wherein the composition of the instant invention (including support) is 1-10 w %, say 6 w % of the total mixture.

It is a feature of this invention that the composition contains (in addition to the porous refractory support) as a first component (i) at least one metal of the actinium series such as thorium and as a second component (ii) at least one alkali metal, preferably potassium, sodium, cesium, or rubidium. Preferred compositions contain potassium and thorium.

These compositions may commonly be prepared by immersing the support, typically gamma alumina of 20-200 micron particle size, in aqueous solutions of water-soluble compounds of the component metals. Typical water-soluble compountd may include: acetates, oxalates, or nitrates cf the actinium series metal and of the alkali metals e.g. sodium, potassium, or cesium. Alkali metal, preferably potassium, is preferably added as the hydroxide KOH. Thorium may be added to the alumina as an aqueous solution of thorium nitrate acidified with sufficient nitric acid to form a clear solution. It is possible to add all the metals of the two components separately or in one operation.

The actinium series metals include elements of atomic number 88 to 102. This group which is sometimes preferred to as the transuranic series includes actinium, thorium, protoactinium, uranium, neptunium, plutonium, americium, curium, berkelinium, californium, einsteinium, fermium, mendelevium, and nobelium. Clearly the metals of this group which are characterized by high degree of radioactivity (e.g. plutonium) or by high cost (e.g. einsteinium) or difficult availability (e.g. nobelium) are less preferred. Preferred is thorium, available as thorium nitrate.

Although naturally occurring thorium, Th$^{232}$, has a half life of radioactive decay by emission of alpha particles of $1.4 \times 10^{10}$ years, thorium oxide, ThO$_2$ has been used in many industrial applications, such as Welsbach mantle, electric lamp, high temperature crucibles, and refractory materials. Thorium oxide has also found use as a catalyst in conversion of ammonia to nitric acid, and in producing sulfuric acid. In many cases, it is used as a mixture with alumina. Particular care should be exercised in the handling of ThO$_2$ as it tends to dust. Radiological toxicity of thorium is connected with the radioactivity of thorium and its daughter products in the thorium decay chain. The calculated radioactivity level, based on the use of 3% K, 3% ThO$_2$/Al$_2$O$_3$ as 10 wt % mixture with cracking catalyst, is $7.6 \times 10^{-14}$ MCurie/ml air which is less than 10% of the permissible level of $1 \times 10^{-12}$ MCurie/ml air. (N.B. Irving, Sax., "Dangerous Properties of Industrial Materials,"Von Nostrand Reinhold Company, pp. 162, 1975). Therefore, the radiation hazard of the process of this invention is considered to be low. Those wishing to practice the process of this invention utilizing radioactive compositions should double check, prior to use, the radiation levels; personnel who operate units containing radioactive compositions should be advised of possible dangers and they should be regularly monitored for dosage level of exposure.

In one preferred embodiment, it may be desirable to add the alumina support to a solution of alkali metal hydroxide and thereafter to add a solution of thorium nitrate. The latter metal is precipitated as the hydroxide or oxide.

The mix then be dried e.g. at 212° F.-300° F. (100° C.-140° C.) for 1-24 hours, say 15 hours and then crushed to desired size of 50-200 microns. It may then be calcined at 1300° F.-1500° F. (704° C.-816° C.), say 1400° F. (760° C.) hours.

More than one metal from each group may be added (e.g. Na and K plus Th and U; or K plus Th and U); it is found, however, that satisfactory (i.e. improved) results may be achieved by use of one metal from each group—e.g. K-Th; Na-Th; K-U; Na-U; etc. The preferred composition contains potassium and thorium: K-Th.

It is preferred that the first component (preferably thorium) be present in the total amount of 0.5 w %–10 w %, preferably 1 w %–3 w % of the support, say 1w %. The second alkali metal component (potassium, sodium, or cesium) is preferably present in amount of 1 w %–5 w %, more preferably 1 w %–3 w %, say 3 w % of the support. A preferred composition may contain 3 w % potassium (expressed as K) plus 1 w % thorium (expressed as $ThO_2$) on gamma- alumina prepared from the Catapal SB alumina. One weight percent of e.g. thorium means thorium in amount sufficient to form $ThO_2$) in amount of 1 w % of total weight. Typically the composition may include catalyst support in amount of 85-98.5 w % of the total composition.

The composition so prepared may in the preferred embodiment be mixed with FCC cracking catalyst and used in an FCCU wherein a sulfur-containing charge hydrocarbon is cracked. Typically the mixture may contain 90-99 parts of cracking catalyst and 1-10 parts of porous refractory support containing 0.5-10 w % thorium and 1-5 w % of at least one alkali metal. Illustrative of the charge hydrocarbons may be a straight run gas oil having API gravity of 22.0-26.4 and containing 0.5-2.5 w % sulfur.

In operation of the FCCU, the charge hydrocarbon is heated to 800° F.-1200° F. (454° C.), say 960° F. (516° C.) at atmospheric pressure, and admitted in vapor phase to the reaction zone (a reducing zone) wherein it contacts the fluidized powdered cracking catalyst and the admixed porous refractory support bearing as a first component (i) at least one metal of the actinium series such as thorium and as a potassium, sodium, or cesium. The charge sulfur-containing hydrocarbon is cracked to yield vapor containing (i) lighter hydrocarbons including those boiling in the motor fuel range and (ii) hydrogen sulfide and mercaptans. This stream is removed from the reaction zone and subjected to separation operations wherein the hydrocarbons are separated from the sulfur-containing components.

In the reaction zone, there is laid down on the catalyst a deposit of coke-carbon in typical amount of 3.5 w %–5.0 w %, say 4.2 w % of the total weight of the catalyst. The catalyst also accumulates solid, sulfur-containing material derived from the charge sulfur-containing hydrocarbon. Typical sulfur content of the spent catalyst may be 0.03 w %–0.04 w %, say 0.03 w %.

The spent catalyst composition bearing the sulfur-containing coke is passed to a regeneration zone (oxidation zone) wherein it is contacted with oxygen-containing gas (oxygen-enriched air or more preferably, air). As regeneration proceeds at 1100° F.-1500° F. (590° C.-815° C.) say 1350° F. (732° C.) and atmospheric pressure, carbon is burned off the catalyst to form carbon dioxide and carbon monoxide. When regeneration is carried out in the "excess oxygen mode", the amount of air used (typically 180-220 thousand lbs. per hour) is sufficient to produce a regenerator off gas containing 77-83 parts, say 79 parts of inert (e.g. nitrogen) gas, 1-7 parts, say 5 parts of oxygen, less than 1 part, of carbon monoxide, and 14-18 parts, say 16 parts of carbon dioxide.

The sulfur content of the catalyst particles is also oxidized to form sulfur oxides $SO_x$ principally sulfur dioxide and sulfur trioxide.

In prior art operation wherein the catalyst composition contains only the FCC catalyst (and not the additive composition of this invention), the regenerator off-gas may contain 3750-5620, say 4680 w ppm sulfur dioxide and 520-780, say 650 wppm-sulfur trioxide, e.g. 1800-2400 ppm(v), say 2500 ppm(v) of sulfur dioxide and 200-300 ppm(v), say 250 ppm(v) of sulfur trioxide. This corresponds to 4-6 w %, say 5 w % of the sulfur which is present in the sulfur-containing hydrocarbon charge.

In practice of the process of this invention wherein the catalyst composition includes the FCC catalyst plus the additive composition of this invention, the regenerator off-gas may contain 281-468 w ppm, say 375 w ppm sulfur dioxide and 39-65 w ppm, say 52 w ppm sulfur trioxide i.e. 135-225 ppm(v), say 180 ppm(v) of sulfur dioxide and 15-25 ppm(v) of sulfur trioxide, say 20 ppm(v). This corresponds to 0.3-0.5 w %, say 0.4 w % of the sulfur that is present in the sulfur-containing hydrocarbon charge.

In practice of a less preferred embodiment of this invention, the sulfur-removing composition containing porous refractory support bearing as a first component (i) at least one metal of the actinium series, such as thorium and as a second component (ii) at least one alkali metal, preferably potassium, sodium, or cesium may be absent from the FCC catalyst composition; and it may be maintained in a separate bed to which the standard FCC regenerator off-gases are passed and wherein the sulfur is fixed in solid form on the sulfur-removing composition. When this less preferred embodiment is employed, the fluidized particles which have adsorbed the sulfur at 1100° F.-1500° F. (595° C.-815° C.), say 1350° F. (732° C.) are regenerated as by passing a hydrogen-containing gas over the catalyst at 850° F.-1000° F. 454° C.-538° C.). say 920° F. (493° C.) at atmospheric pressure.

In practice of the process of this invention, much of the sulfur in the regenerator becomes fixed in solid form (as sulfate, etc) on the porous refractory support bearing as a first component at least one metal of the actinium series such as thorium and as a second component (ii) at least one alkali metal, preferably potassium, sodium, or cesium. The total sulfur content of the fluidized cracking catalyst composition including the additive may be 0.03-0.04 w %, say 0.034 w %, say 0.034 w % (as S) based on total composition.

This sulfur-bearing regenerated catalyst composition is preferably passed to the reaction zone, wherein, under the conditions of reaction, much of the sulfur thereon is released as hydrogen sulfide and mercaptans.

The overall result of this sequence of operations in the typical FCCU is that:

(i) 20-35 w %, of the 2 w % of the sulfur in the charge hydrocarbon is desirably released as hydrogen sulfide and mercaptans in the reaction zone overhead;

(ii) 0.3-0.5 w %, of the 2 w % of the sulfur in the charge hydrocarbon is found in the regenerator off-gas; and (iii) the $SO_x$ content of the regenerator off-gas is reduced to 150-250 ppm(v), say 200 ppm(v)-cf prior operations undesirably yielding 2000-3000ppm(v), say 2500 ppm(v).

It is a particular feature of the process of this invention, that the typical potassium/thorium/alumina composition permits operation wherein $SO_x$ may be readily removed from charge $SO_x$-containing streams. In the case of FCC operations, it is possible to carry out the process so that as little as 0.3 w % of the feed sulfur in the hydrocarbon charge shows up in the regenerator off-gas. Use of pure alumina gives off-gas containing 2.4 w % SOand use of prior art equilibrium Davison CBZ-1 catalyst gives 4.7 w %.

It is a further feature of the process of this invention that the systems of this invention may be found to be more effective if the compositions are steamed prior to use. Steaming is preferably carried out by contacting the composition with steam at 1200° F.-1500° F., preferably 1300° F.-1470° F., say 1400° F. and 0.2-10 atmospheres, preferably 1-7 atmospheres, say one atmosphere pressure for 5-72 hours, preferably 10-48 hours, say 24 hours.

In the case of the catalyst containing 3% K/3% $ThO_2/Al_2O_3$, it is thereby possible to lower the $SO_x$ content from 0.47 w % down to 0.17 w % ($SO_x$ emission in regenerator off-gas as w % of the feed sulfur).

Practice of the process of this invention will be apparent to those skilled in the art from inspection of the following examples wherein, as elsewhere in this specification, all parts are parts by weight unless otherwise stated.

DESCRIPTION OF SPECIFIC EMBODIMENTS

EXAMPLE I

In this example, which represents the best mode presently known of carrying out the process of this invention, the charge alpha aluminum oxide monohydrate (100 parts) is Catapal SB alumina marketed by Conoco. This is pure alumina (of 50-200 micron particle size) except for the following impurities:

TABLE

| Component | w % |
|---|---|
| $TiO_2$ | 0.12 |
| $SiO_2$ | 0.008 |
| $Fe_2O_3$ | 0.005 |
| Carbon | 0.36 |
| Sulfur | 0.01 |
| $Na_2O$ (plus all alkali metals) | 0.004 |

Water is added to this charge gamma alumina (125 parts) to form a paste. There is added thereto with mixing a solution of 4.30 parts of potassium hydroxide in 50 parts of water. A solution containing 50 parts of water and 6.30 parts of thorium nitrate ($Th(NO_3)_3.4H_2O$) is added to the potassium-containing alumina, mixing well. 20 Parts of concentrated ammonium hydroxide are added to insure precipitation of thorium hydroxide $Th(OH)_4$. The mix is heated at 140° F. for 2 hours to remove ammonia and then dried at 220° F. for 15-24 hours and then calcined at 800° F. for 18 hours. Analysis showed that the composition contained alumina, 3 w % potassium (K), and 3 w % thorium ($ThO_2$)the latter two percentages based on the alumina. It was then pulverized to 50-200 micron size and mixed with nine times its weight of commercial equilibrium cracking catalyst — Davidson CBZ-1 brand catalyst containing originally 15 w % rare earth exchanged Y zeolite plus 85 w % silica-alumina.

This catalyst composition is evaluated for its $SO_x$ emission reduction capacity in a micro activity tester which simulates FCC conditions including the following:

TABLE

| | Condition | Value |
|---|---|---|
| Reaction Zone | Average Temperature (°F.) | 920 |
| | Reaction Time (min) | 10 |
| | Pressure | atmospheric |
| | Nitrogen Flow rate ml/min | 30 |
| | Catalyst: oil (wt ratio) | 3.0 |
| Regeneration Zone | Air Flow ml/min | 230 |
| (Complete coke combustion mode) | Average Temperature (°F.) | 1240 |
| | Regeneration Time (min) | 25 |

The charge to the reaction zone, in vapor phase at 920° F. (473° C.), is a synthetic gas oil containing 2 w % sulfur having the following composition:

TABLE

| Property | W % |
|---|---|
| n-dodecane | 90.6 |
| Hexene-1 | 1.0 |
| Benzothiophene | 8.4 |

During evaluation, measurements were made of (i) the $SO_2$ emitted in the regenerator off-gas, these being reported as w % of the sulfur contained in the sulfur-containing hydrocarbons charge and (ii) the sulfur ($H_2S$ and mercaptans) contained in the cracked product leaving the reactor overhead-as weight % of the sulfur contained in the sulfur-containing hydrocarbon charge.

The results are tabulated in the Table following Example IV.

EXAMPLE II

In Example II, a second additive falling within the scope of this invention was prepared having the following compositions:

| Example | Composition |
|---|---|
| II | 3% K/1% $ThO_2/Al_2O_3$ |

In control Examples III*-VIII* various formulations falling outside the scope of the instant invention are made up in manner generally similar to the procedure of Example I. The material tested in control Example IV* is Catapal SB alumina alone; and in control Example III*, the material tested is the equilibrium Davison CBZ-1 Brand catalyst. The catalysts of Examples IV*-VIII* were tested in admixture with nine times their weight of equilibrium CBZ-1 catalyst.

$SO_x$ is tabulated as the $SO_x$ content of regenerator off-gas measured as weight percent of the sulfur in the hydrocarbon charge (2 w %). $H_2S$ is tabulated as content of the reactor off-gas measured as weight percent of the sulfur in the hydrocarbon charge.

Potassium content is as metal (K) based on the total weight including alumina. Thorium content is as oxide (ThO$_2$) based on total weight including alumina.

TABLE
FRESH CATALYST

| Example | Catalyst | SO$_x$ | H$_2$S |
|---------|----------|--------|--------|
| I | 3% K/3% ThO$_2$Al/$_2$O$_3$ | 0.47 ± 0.10 | 27 |
| II | 3% K/1% ThO$_2$/Al$_2$O$_3$ | 0.34 ± 0.10 | 27 |
| III* | Equil Davison CBZ-1 | 4.7 ± 0.2 | 30 |
| IV* | Alumina | 2.4 ± 0.2 | 27 |
| V* | 1% ThO$_2$/Al$_2$O$_3$ | 0.56 ± 0.10 | 32 |
| VI* | 3% ThO$_2$/Al$_2$O$_3$ | 0.44 ± 0.20 | 32 |
| VII* | 10% ThO$_2$/Al$_2$O$_3$ | 0.26 ± 0.13 | 32 |
| VIII* | 3% K/Al$_2$O$_3$ | 0.40 ± 0.10 | 24 |

From the above table, it is apparent that Experimental Examples show that the catalyst compositions of this invention permit attainment of satisfactory low levels of SO$_x$ in the regenerator off gas.

EXAMPLES IX-XIX

In these Examples, the compositions hereafter tabulated were made up in manner comparable to the procedures for Examples I-VIII* except that the compositions of Examples IX-XIX* were steamed prior to use. Steaming was carried out by subjecting the composition to 100% steam atmosphere at 1470° F./1 atmosphere for 24 hours. In Examples IX, XI, and XII, regeneration was carried out at 1350° F. Other examples were regenerated at 1240° F. In Example XII, the charge hydrocarbon contained 4 w % sulfur-all other Examples being carried out with a charge containing 2 w % sulfur.

In each case, the composition was subjected to a plurality of cycles; each cycle comprises a reaction time of 10 minutes at 920° F. followed by a regeneration time of 15 minutes at 1240° F. or 1350° F.

TABLE
STEAMED CATALYST

| Example | Catalyst | Cycles | SO$_x$ | H$_2$S |
|---------|----------|--------|--------|--------|
| IX | 3% K/3% ThO$_2$/Al$_2$O$_3$ | 5 | 0.34 ± 0.10 | 30 |
| X | 3% K/3% ThO$_2$/Al$_2$O$_3$ | 18 | 0.17 ± 0.27 | 29 |
| XI | 3% K/1% ThO$_2$/Al$_2$O$_3$ | 5 | 0.64 ± 0.10 | 26 |
| XII | 3% K/1% ThO$_2$/Al$_2$O$_3$ | 7 | 0.54 ± 0.10 | 21 |
| XIII | 3% K/1% ThO$_2$/Al$_2$O$_3$ | 15 | 0.59 ± 0.13 | 29 |
| XIV* | Alumina | 8 | 1.5 | 31 |
| XV* | 1% ThO$_2$/Al$_2$O$_3$ | 3 | 1.6 ± 0.1 | 31 |
| XVI* | 3% ThO$_2$/Al$_2$O$_3$ | 7 | 1.4 ± 0.1 | 31 |
| XVII* | 10% ThO$_2$/Al$_2$O$_3$ | 6 | 0.59 ± 0.10 | 30 |
| XVIII* | 2% K/Al$_2$O$_3$ | 5 | 1.3 | 30 |
| XIX* | 3% K/Al$_2$O$_3$ | 5 | 0.84 ± 0.23 | 28 |

From the above table, it is apparent that operation in accordance with practice of the process of this invention permits attainment of an off-gas containing as low as 0.17 w % SO$_x$.

More striking, however, is the fact that (compare Example X with Example I) after 18 cycles, the performance of the 3% K/3% ThO$_2$/Al$_2$O$_3$ system has improved by a factor of 0.47/0.17 or 276% i.e. the SO$_x$ content has decreased with time to 44% of the initial content.

In contrast, the control catalyst of Example VIII* gave 0.40 w % which increased to 0.84 w % after 5 cycles.

From these tables, it is apparent that the catalysts of this invention permit attainment of desired results and that, if the catalyst is steamed prior to first use, these results continue to improve with time. A steamed catalyst of this invention may be twice as good (or more) after use for an extended period of time as the unsteamed catalysts.

Although this invention has been illustrated by reference to specific embodiments, it will be apparent to those skilled in the art that various changes and modifications may be made which clearly fall within the scope of this invention.

We claim:

1. A composition of matter, consisting essentially of refractory support bearing as a first component (i) at least one metal of the actinium series and as a second component (ii) at least one alkali metal.

2. A composition of matter as claimed in claim 1 wherein said porous refractory support is alumina.

3. A composition of matter as claimed in claim 1 wherein said first component is present in amount of 0.5 w % -10 w %.

4. A composition of matter as claimed in claim 1 wherein said second component is present in amount of 1 w % - 5 w %.

5. A composition of matter comprising a porous refractory support bearing as a first component (i) thorium. and as second component (ii) at least one alkali metal, as a solid composition with sulfur.

6. A composition of matter comprising
   (a) 90-99 parts of cracking catalyst;
   (b) 1-10 parts of porous support containing 0.5-10 w % of thorium and 1-5 w % at least one alkali metal.

7. A composition of matter consisting essentially of a porous refractory support bearing as a first component (i) at least one metal of the actinium series and as a second component (ii) at least one alkali metal wherein said porous refractory support is alumina, silica, magnesia, silica-alumina, silica-magnesia, or a zeolite.

8. A composition of matter comprising a porous refractory support bearing as a first component (i) at least one metal of the actinium series and as a second component (ii) at least one alkali metal wherein said composition is steamed at 1200° F.-1500° F. and 0.2-10 atmospheres for 5-72 hours.

9. A composition of matter consisting essentially of (i) 0.5 w %-10 w % of at least one metal of the actinium series as first component and (ii) 1 w %-5 w % of at least one alkali metal as second component on a porous refractory support present in amount of 85 w %-98.5 w % of total weight.

10. A composition of matter consisting essentially of a mordenite porous refractory support bearing as a first component (i) at least one metal of the actinium series and (ii) as second component at least one alkali metal.

* * * * *